United States Patent [19]

Tagliarino

[11] Patent Number: 4,542,642
[45] Date of Patent: Sep. 24, 1985

[54] PLUG FOR TEST TEE

[76] Inventor: Joseph Tagliarino, 107 S. Lincoln Ave., Tampa, Fla. 33609

[21] Appl. No.: 633,969

[22] Filed: Jul. 24, 1984

[51] Int. Cl.⁴ .............................................. G01M 3/28
[52] U.S. Cl. .................... 73/40.5 R; 73/49.8; 138/90
[58] Field of Search ............... 73/40.5 R, 40, 46, 49.8; 138/94, 93, 90

[56] References Cited

U.S. PATENT DOCUMENTS

| | | | |
|---|---|---|---|
| 868,936 | 10/1907 | McGinn | 138/90 |
| 1,573,410 | 2/1926 | McCabe et al. | 138/90 |
| 1,784,238 | 12/1930 | Kennedy | 138/90 X |
| 1,904,688 | 4/1933 | Kennedy | 138/90 |
| 3,091,259 | 5/1963 | Alessio | 138/90 |
| 3,431,945 | 3/1969 | Robillard | 138/90 |
| 3,941,156 | 3/1976 | Metzger | 138/90 |
| 4,429,568 | 2/1984 | Sullivan | 73/49.8 |

Primary Examiner—Stewart J. Levy
Assistant Examiner—Joseph W. Roskos
Attorney, Agent, or Firm—Frijouf, Rust & Pyle

[57] ABSTRACT

A testing device is disclosed for testing a drainage system for leaks, the testing device being selectively connectible to a source of fluid flow. The testing device includes an elongate tubular member having a first and a second end. The tubular member is disposed in fluid tight series communication between the drainage system and the drain. The tubular member defines an internal annular ledge which is disposed between the first and the second end of the tubular member. The tubular member also defines a first lateral hole which is disposed longitudinally away from the ledge. A removable blocking disc sealingly engages the ledge for temporarily preventing flow of fluid from the drainage system to the drain during the testing of the system for leaks. A closure is disposed within an access opening for permitting access to and removal therethrough of the blocking disc from the tubular member subsequent to the testing of the system after the removal of the closure from the access opening. The access opening and the first hole are disposed longitudinally on opposite sides of the blocking disc. The closure defines a second hole such that the second hole is selectively connectible to the source of fluid flow for filling the drainage system prior to testing thereof. The second hole is subsequently connected to the first hole for permitting drainage of the fluid between the drainage system and the drain subsequent to the testing of the drainage system for leaks and prior to removing the blocking disc.

14 Claims, 5 Drawing Figures

PLUG FOR TEST TEE

BACKGROUND OF THE INVENTION

1. Field of the Invention

This invention relates to a testing device for testing a drainage system for leaks. More particularly, this invention relates to a testing tee for testing a drainage or plumbing system for leaks.

2. Information Disclosure Statement

During the construction of a high rise building such as an office complex or a multistory residential accommodation, a plurality of drainage sections are interconnected so that sewage and the like may flow from a plurality of toilets on various floors of the building down standpipe drains to a drainage system. The standpipes are provided with test tees for testing and cleaning the drainage system. Before completion of the building, the drainage or sewage system is inspected for leaks. It is customary for the test tees in the standpipes to be opened and a plug or inflatable collar is inserted into the test tee. The drain system is then filled with water above the plug and inspected for any leakage therefrom. A conventional test tee includes an elongate tubular member which is permanently installed in the standpipe or the stack of sewage sections. The test tee includes a lateral extension and an access cover which is provided for the purpose of permitting insertion therein of the plug or inflatable collar.

A modification of the aforementioned test tee is U.S. Pat. No. 1,554,856 to Kennedy in which a plug 15 disposed within the test tee is selectively moved from a first position, in which the plug 15 engages a seat 6 of the test tee to a second position in which the plug 15 permits flow of fluid through the test tee to the drain. The plug 15 is moved from the first to the second position thereof by a mechanical linkage which is operable from the outside of the test tee.

Furthermore, U.S. Pat. No. 1,573,410 to McCabe et al discloses a test tee in which a plug 11 is selectively seated against a valve seat 8 defined by a test tee. Water is supplied to the stand pipes above the seated plug 11 through a conduit extending through the plug 11.

U.S. Pat. No. 3,941,156 to Metzger teaches a test tee having a permanently fixed plate 8 and a valve 9 for permitting drainage of the head of water above the test tee. However, the disclosure by Metzger requires removal of the head of water through hose 10 to a closet fixture 14.

However, the use of the prior art plugs involve certain inherent problems particularly when the plug was inserted into a sewage line which was not perfectly circular in cross section because the water above the plug would tend to leak past the plug thereby wrongly indicating to the building inspector the existence of a leak in the drainage system.

Because of the aforementioned problem associated with plugs for insertion within a test tee, various inflatable plugs or collars have been developed such that the inflatable plug is inserted within the test tee and connected to a source of fluid pressure to expand the flexible plug into close conformity with the internal bore of the test tee thereby avoiding the tendency of the water to leak past the plug.

U.S. Pat. No. 2,279,257 to Svirsky teaches such an expandable flexible plug 22 which is inserted within a test tee. Pressure is applied to the inside of the expandable plug 22 through a selector valve 24, which is in fluid communication with an internal cavity defined by the plug 22. Whereas the prior art inflatable plug or collar overcomes the aforementioned problems, the cost of manufacturing such a plug and the provision of a compressor for inflating the plug greatly increases the overall cost of testing drainage or plumbing installations or the like.

Also, when the inspection operation has been completed, and the prior art plug or inflatable collar is removed from the test tee and a considerable volume of water supported by the plug or collar flows downwardly through the test tee and a portion of this water flows outwardly through the cover of the test tee which sometimes causes flooding and damage to further installations at the base of the building.

The test tee of the present invention seeks to overcome the aforementioned problems associated with the prior art devices by providing a test tee with pre-installed removable disc which prevents flow of water therepast. The cover or closure of the test tee includes a hole through which the drainage system above the disc may be filled with water. Also, the present invention includes a further hole disposed below the disc such that when the test for leaks has been completed, the head of water above the disc may be directed out of the test tee through the hole in the cover and may be directed into the drain through the further hole disposed below the disc. On completion of the removal of the head of water from the drainage system, the cover or closure is removed from the test tee and the disc is removed from the test tee through the opening of the test tee. The cover is reconnected to the test tee and the test tee remains as a permanent fitting in series connection with the drainage system.

Therefore, the primary object of the present invention is the provision of a testing device or test tee which overcomes the aforementioned problems associated with the prior art testing devices and provides an improvement which significantly contributes to the ease and the low cost involved in inspecting a drainage system or the like.

Another object of the present invention is the provision of a testing device having a factory installed removable disc disposed within the test tee for selectively preventing the flow of water passed the disc.

Another object of the present invention is the provision of a testing device which permits filling the drainage system above the removable disc with water supplied to the drainage system through a hole in the cover of the test tee.

Another object of the present invention is the provision of a testing device in which the head of water above the disc is caused to bypass the disc and to flow out of the test tee through the hole in the closure and into the drain through a hole defined by the test tee and disposed beneath the disc, thereby avoiding flooding of the building on removal of the closure subsequent to testing of the drainage system.

Another object of the present invention is the provision of a testing device which is easily manufactured and which therefore costs relatively little to fabricate.

Further objects and advantages of the present invention will become apparent from the study of the following portions of this specification, the claims and the attached drawings.

The foregoing has outlined some of the more pertinent objects of the present invention. These drawings should be construed to be merely illustrative of some of the more prominent features and applications of the invention. Many other beneficial results can be obtained by applying the disclosed invention in a different manner or modifying the invention within the scope of the disclosure. Particularly with regard to the use of the invention disclosed herein, this should not be construed as limited to a test tee for testing a drainage system for leaks, but should include a testing device for testing any piped installation for leaks.

SUMMARY OF THE INVENTION

The invention is defined by the appended claims with a specific embodiment shown in the attached drawings. For the purpose of summarizing the invention, the invention relates to a testing device for testing a drainage system for leaks, the testing device being selectively connectible to a source of fluid flow. The invention also relates to a method of testing a drainage system or a sewage system for leaks. The testing device includes an elongate tubular member having a first and a second end. The tubular member is disposed in fluid tight series communication between the drainage system and the drain. The tubular member defines an internal annular ledge which is disposed between the first and the second end of the tubular member. The tubular member defines hole which is disposed longitudinally away from the ledge. A removably blocking disc sealingly engages the ledge for temporarily preventing the flow of fluid from the drainage system to the drain during the testing of the system for leaks. An access opening for permitting access to the blocking disc and for removal of the blocking disc therethrough is disposed longitudinally on the opposite side of the blocking disc from the first hole. The access opening is covered by a first closure which defines a second hole such that the second hole is selectively connectible to the source of fluid flow for filling the drainage system prior to testing thereof. The second hole is subsequently connectible to the first hole for permitting drainage of the fluid between the drainage system and the drain subsequent to the testing of the drainage system for leaks and prior to the removal of the blocking disc from the ledge. A first and a second plug cooperate with the first and second holes respectively subsequent to the removal of the blocking disc from the elongate tubular member through the access opening.

In a more specific embodiment of the present invention, the first and the second ends of the elongate tubular member each define a socket for the reception therein of one end of the drainage system and one end of the drain respectively and the elongate tubular member defines a semi-circular cavity disposed adjacent the blocking disc for facilitating the removal of the blocking disc from the ledge. The first and the second holes threadably cooperate respectively with the first and the second plugs. The first hole is disposed between the ledge and the second end of the tubular member and the second hole is defined by the closure. The blocking disc is of a water impermeable plastic material and is of frusto conical configuration and cooperates with a correspondingly frusto conical shaped seat of the ledge. The disc also includes an upstanding portion which extends obliquely from the disc for cooperating with a hand tool inserted through the access opening for facilitating removal of the disc from the ledge.

The closure threadably cooperates with an access opening defined by an extension which extends laterally from the elongate tubular member and is formed integrally therewith. The testing device also includes a length of flexible hose which has a first and a second end. A first and a second coupling are disposed at the first and the second end of the hose respectively and a shut off valve having a first and a second end is connected to the first end of the hose such that the first end of the shut off valve is connected to the first end of the hose and the second end of the shut off valve threadably cooperates with the second hole defined by the closure. The second end of the hose is selectively connected to the source of fluid flow thereby enabling the filling of the drainage system through the second hole prior to testing the drainage system for leaks. When the drainage system has been tested for leaks, the second end of the hose is disconnected from the source of fluid flow and is inserted through the first hole for permitting flow of fluid from the drainage system to the drain prior to the removal of the blocking disc.

The method of testing a drainage system, according to the present invention, includes the steps of sealing the end of the drain within the second socket of the elongate tubular member and inserting and sealing the end of the drainage system within the first end of the elongate tubular member. The second plug is then removed from the second hole and the second end of the shut off valve is connected to the second hole. The second end of the hose is connected to the source of fluid flow and the shut off valve is opened thereby permitting fluid to flow through the second hold into the drainage system for filling the same. The drainage system is then inspected for leakage from the various joints of the drainage system. With the shut off valve closed, the second end of the hose is disconnected from the source of fluid flow and the first plug is removed from the first hole. The second end of the hose is inserted within the first hole and the shut off valve is opened for permitting fluid contained within the drainage system to flow from the drainage system through the shut off valve and the hose to the drain for draining the drainage system. The second end of the shut off valve and the second end of the hose are then removed from the second and first holes respectively and the closure is removed from the access opening for gaining access to the blocking disc. The removal tool is inserted under the obliquely extended portion of the disc to facilitate removal of the disc from the ledge and through the access opening and the closure is replaced within the access opening. Finally, the first and the second plugs are replaced within the first and the second holes respectively to seal the drainage system for use thereof.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject matter of the claims of the invention. It should be appreciated by those skilled in the art that the conception and specific embodiment disclosed may be readily utilized as a basis for modifying or designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE DRAWINGS

Figure 1:
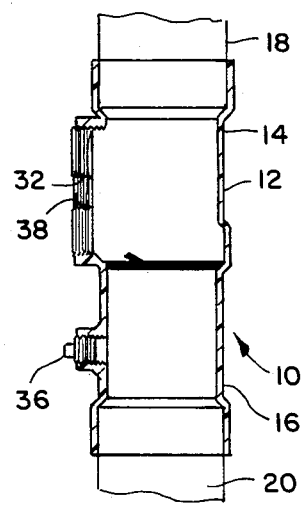
FIG. 1 is a side elevational view of the test tee according to the present invention.

FIG. 1 is an elevational view of the testing device or test tee of the present invention. The test tee generally designated 10 includes an elongate tubular member 12 having a first and a second end 14 and 16 respectively. The tubular member 12 is disposed in fluid tight series communication between the drainage system 18 and the drain 20. The tubular member 12 defines an internal annular ledge 22 shown in FIG. 2. The ledge 22 is disposed between the first and the second ends 14 and 16 of the tubular member 12. The tubular member 12 defines a first hole 24 disposed longitudinally away from the ledge 22. A removable blocking means or disc 26 sealingly engages the ledge 22 for temporarily preventing the flow of fluid from the drainage system 18 to the drain 20 during the testing of the system 18 for leaks.

Figure 2:
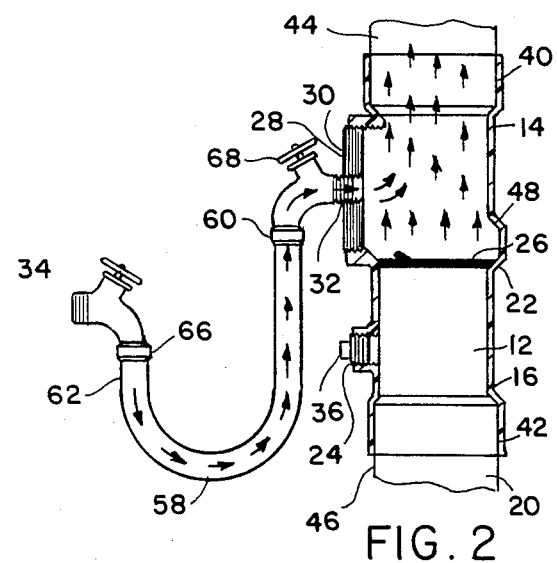
FIG. 2 is a sectional view of the test tee shown in FIG. 1 showing the hose connected to a source of fluid flow for filling the drainage system above the disc.

An access means 28 permits access to and removal therethrough of the blocking disc 26 from the tubular member 12 subsequent to the testing of the system 18. The access means 28 and the first hole 24 are disposed longitudinally on opposite sides of the blocking disc 26. The access means 28 includes a closure means or cover 30 which defines a second hole 32 such that the second hole 32 is selectively connectible to a source of fluid flow 34 as shown in FIG. 2 for filling the drainage system 18 prior to the testing thereof. The second hole 32 is subsequently connected to the first hole 24 for permitting drainage of the fluid between the drainage system 18 and the drain 20 subsequent to the testing of the drainage system 18 for leaks and prior to the removal of the blocking disc 26. A first and a second plug 36 and 38 plug the first and the second holes 24 and 32 respectively subsequent to the removal of the blocking disc 26 from the tubular member 12.

Figure 3:
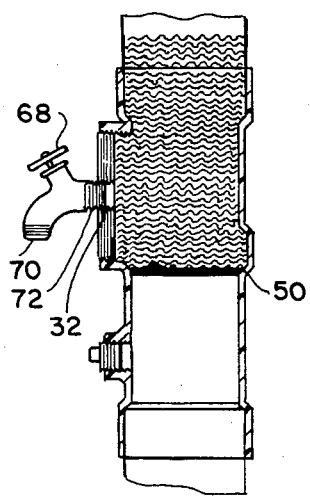
FIG. 3 is a similar view to that shown in FIG. 2 but shows the shut off valve closed, thereby permitting the inspection of the drainage system for leaks.
Figure 5:
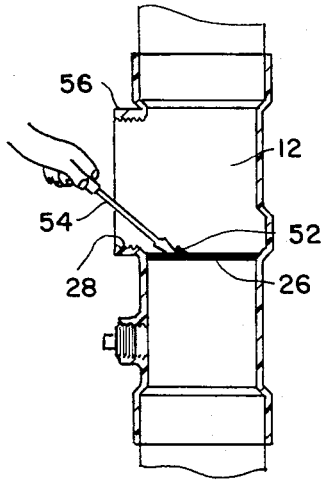
FIG. 5 is a similar view to that shown in FIG. 2 but shows the closure removed from the access opening and the removal tool such as a screwdriver cooperating with the oblique portion for facilitating removal of the disc from the ledge and through the access opening.
Figure 4:
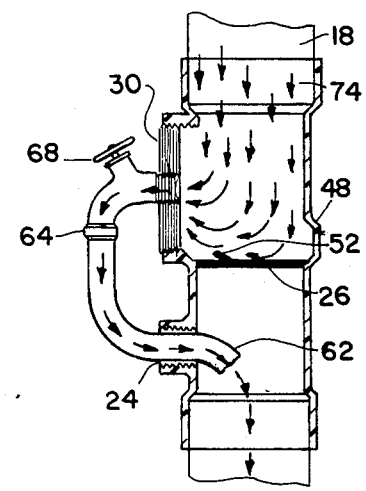
FIG. 4 is a similar view to that shown if FIG. 2 but shows the hose connected to the first end of the shut off valve and with the second end of the hose inserted through the first hole and with the shut off valve open to permit flow of fluid from the drainage system through the shut off valve and hose into the drain.

The first and the second ends 14 and 16 respectively of the elongate tubular member 12 defines sockets 40 and 42 for the reception therein of one end 44 of the drainage system 18 and one end 46 of the drain 20 respectively. The elongate tubular member 12 define a semi-circular cavity 48 disposed adjacent to the blocking disc 26 for facilitating removal of the blocking disc 26 from the ledge 22. The first hole 24 threadably cooperates with the first plug 36 for plugging the first hole and the first hole 24 is disposed between the ledge 22 and the second end 16 of the tubular member 12, the first hole 24 being disposed below the blocking disc 26. The removable blocking means 26 is of a water impermeable material such as plastic or rubber and is of a frusto conical configuration for cooperating with a correspondingly frusto conical shaped seat 50 of the ledge 22 as shown in FIG. 3. The disc 26 includes an upstanding portion 52 as shown in FIG. 4 which extends obliquely from the disc 26 for cooperating with a hand tool 54 such as a screwdriver as shown in FIG. 5 for facilitating the removal of the disc 26 from the ledge 22. The diameter of the disc 26 is less than the width of the access opening 28 such that the disc 26 is able to be removed from the elongate tubular member 12 through the access opening. The access opening 28 is defined by an extension 56 which extends laterally from the elongate tubular member 12 and is formed integrally therewith. The extension 56 defines the opening 28 which permits removal of the blocking disc 26 therethrough and the opening 28 threadably cooperates with the closure 30. The second hole 32 which is defined by the closure means 30 is threaded for selective coupling to the source of fluid flow 34 and the second plug 38. The testing device 10 also includes a length of flexible hose 58 having a first and a second end 60 and 62 respectively. A first and a second coupling 64 and 66 are disposed at the first and the second end 60 and 62 respectively of the hose 58 and a shut off valve 68 having a first and a second end 70 and 72 respectively is connected to the second hole 32 such that the first end 70 of the shut off valve 68 is connected in fluid tight communication with the first end 60 of the hose 58 and the second end 72 of the shut off valve 68 threadably cooperates with the second hole 32. The second end 62 of the hose 58 is selectively connected to the source of fluid flow 34 for filling the drainage system 18 through the second hole 32 prior to testing the drainage system 18. The second end 62 of the hose 58 is disconnected from the source of fluid flow 34 and inserted through the first hole 24 subsequent to the testing of the drainage system 18 for permitting flow of fluid from the drainage system 18 to the drain 20 prior to removal of the blocking means 26.

FIGS. 2-5 show various steps involved in the use of the testing tee 10 of the present invention. Initially, the testing tee 10 is installed in series connection between the drainage system 18 and the drain 20 with the disc 26 preferably being factory sealed to the seat of the ledge 22 prior to installation thereof. The second plug 38 is removed from the second hole 32 and the second end 72 of the shut off valve 68 is connected to the second hole 32 and water from the source of fluid pressure 34 is permitted to flow through the hose 58 and into the drainage system 18 through the second hole 32. When the drainage system 18 has been filled, the shut off valve 68 is closed and the drainage system 18 is tested by the building inspector for leaks, the joints of the various sections of the sewage or plumbing line being inspected for possible leakage therefrom. When the drainage system has been tested for leaks, the second end 62 of the hose 58 is disconnected from the source of fluid pressure 34 and the second end 62 is inserted through the first hole 24 after the removal of the first plug 36 therefrom. Next, the shut off valve 68 is opened to permit the head of water 74 above the disc 26 to flow through the shut off valve 68 and the hose 58 and into the drain 20. When the head of water 74 has been drained from the drainage system 18 the hose 58 and the shut off valve 68 are disconnected from the first and second holes 24 and 32 respectively and the closure 30 is removed from the access opening 28 in order to gain access to the disc 26. As shown in FIG. 5 the removal tool or screwdriver 54 is inserted under the oblique portion 52 of the disc 26 and the disc 26 is lifted from the seat 50 of the ledge 22. The semi-circular cavity 48 facilitates removal of the disc 26 from the ledge 22 and avoids wedging of the disc 26 within the elongate tubular member 12. The disc 26 is removed through the access opening 28 and the closure 30 is again replaced within the access opening 28 and the first and the second plugs 36 and 38 are secured within the first and second holes respectively to seal the test tee for subsequent usage of the drainage system.

The present invention provides many advantages over the prior art devices. Particularly because the test tee of the present invention does not require the insertion therein of a plug or inflatable collar. Also the present invention makes testing of the drainage system a simple operation because the drainage system is able to be filled from the location of the test tee rather than at the top of the drainage system. Furthermore, the test tee of the present invention avoids the possibility of flooding associated with the prior art devices during removal of the plug or inflatable collar from the test tee.

All of the aforementioned advantages together with the low cost of manufacture of the test tee of the present invention contribute to a significant improvement over the prior art devices.

The present disclosure includes that contained in the appended claims as well as the foregoing description. Although the invention has been described with a certain degree of particularity, it is understood that the present disclosure in the preferred form has been made only by way of example and that numerous changes in the details of construction and the combination and arrangement of parts may be resorted to without departing from the spirit and scope of the invention.

What is claimed is:

1. A testing device for testing a drainage system for leaks, said testing device being selectively connectible to a source of fluid flow, said testing device comprising in combination;
   an elongate tubular member having a first and a second end, said tubular member being disposed in fluid tight series communication between the drainage system and a drain, said tubular member defining an internal annular ledge disposed between said first and said second end of said tubular member, said tubular member defining a first hole disposed longitudinally away from said ledge;
   removable blocking means sealingly engaging said ledge for temporarily preventing the flow of fluid from the drainage system to the drain during the testing of the system for leaks;
   access means defined by said tubular member for permitting access to and removal therethrough of said blocking means from said tubular member subsequent to the testing of the system, said access means and said first hole being disposed longitudinally on opposite sides of said blocking means from, said access means including a first closure means for closing said access means, said closure means defining a second hole such that said second hole is selectively connectible to the source of fluid flow for filling the drainage system prior to testing thereof, said second hole being subsequently connectible to said first hole for permitting drainage of fluid between the drainage system and the drain subsequent to the testing of the drainage system for leaks and prior to the removal of said blocking means; and
   a first and a second plug means for plugging said first and said second holes respectively subsequent to removal of said blocking means from said tubular member.

2. A testing device as set forth in claim 1 wherein the first and the second ends of said elongate tubular member each define a socket for the reception therein of one end of the drainage system and one end of the drain respectively.

3. A testing device as set forth in claim 1 wherein said elongate tubular member defines a semi-circular cavity disposed adjacent to said blocking means for facilitating removal of said blocking means from said ledge.

4. A testing device as set forth in claim 1 wherein said first hole threadably cooperates with said first plug means for plugging said first hole, said first hole being disposed between said ledge and said second end of said tubular member.

5. A testing device as set forth in claim 1 wherein said removable blocking means is a water impermeable plastic disc.

6. A testing device as set forth in claim 5 wherein said blocking means is of a frusto conical configuration and cooperates with a correspondingly frusto conical shaped seat of said ledge.

7. A testing device as set forth in claim 5 wherein said removable blocking means further includes:
   an upstanding portion extending obliquely from said disc for cooperating with a hand held tool for facilitating the removal of said disc from said ledge.

8. A testing device as set forth in claim 5 wherein the diameter of said disc is less than the width of said access means such that said disc is able to be removed from said elongate tubular member through said access means.

9. A testing device as set forth in claim 1 wherein said access means further includes:
   an extension extending laterally from said elongate tubular member and formed integrally therewith, said extension defining an opening which permits removal of said blocking means therethrough, said opening threadably cooperating with said first closure means.

10. A testing device as set forth in claim 1 wherein said second hole is threaded for selective coupling to the source of fluid flow and said second plug means.

11. A testing device as set forth in claim 1 wherein said testing device further includes;
   a flexible hose having a first and a second end;
   a first and a second coupling disposed adjacent said first and second end of said hose respectively;
   a shut off valve having a first and a second end, said first end of said shut off valve being connected in fluid type communication with said first end of said hose, said second end of said shut off valve threadably cooperating with said second hole;

said second end of said hose being selectively connected to the source of fluid flow for filling the drainage system through said second hole prior to testing the drainage system, said second end of said hose being disconnected from said source of fluid flow and inserted through said first hole subsequent to the testing of the drainage system for permitting flow of fluid from the drainage system to the drain prior to removal of said blocking means.

12. A testing device for testing a drainage system for leaks, said testing device being selectively connectible to a source of fluid flow, said testing device comprising in combination;

an elongate tubular member having a first and a second end, said tubular member being disposed in fluid tight series communication between the drainage system and a drain, said tubular member defining an internal annular ledge disposed between said first and said second end of said tubular member, said tubular member defining a first lateral hole disposed longitudinally away from said ledge;

a blocking disc sealingly engaging said ledge for temporarily preventing the flow of fluid from the drainage system to the drain during the testing of the system for leaks;

access means defined by said tubular member for permitting access to and removal therethrough of said blocking disc from said tubular member subsequent to the testing of the system, said access means and said first hole being disposed longitudinally on opposite sides of said blocking disc, said access means including;

a first closure means for closing said access means, said closure means defining a second hole such that said second hold is selectively connectible to the source of fluid flow for filling the drainage system prior to testing thereof, said second hole being subsequently connectible to said first hole for permitting drainage of fluid between the drainage system and the drain subsequent to the testing of the drainage system for leaks and prior to the removal of said blocking disc; and a first and a second plug means for plugging said first and said second holes respectively subsequent to removal of said blocking disc from said tubular member.

13. A testing device for testing a drainage system for leaks, said testing device being selectively connectible to a source of fluid flow, said testing device comprising in combination;

an elongate tubular member having a first and a second end, said tubular member being disposed in fluid tight series communication between the drainage system and a drain, said tubular member defining an internal annular ledge disposed between said first and said second end of said tubular member, said tubular member defining a first lateral hole disposed longitudinally away from said ledge;

a blocking disc sealingly engaging said ledge for temporarily preventing the flow of fluid from the drainage system to the drain during the testing of the system for leaks;

access means defined by said tubular member for permitting access to and removal therethrough of said blocking disc from said tubular member subsequent to the testing of the system, said access means and said first hole being disposed longitudinally on opposite sides of said blocking disc, said access means including;

a first closure means for closing said access means, said closure means defining a second hole such that said second hole is selectively connectible to the source of fluid flow for filling the drainage system prior to testing thereof, said second hole being subsequently connectible to said first hole for permitting drainage of fluid between the drainage system and the drain subsequent to the testing of the drainage system for leaks and prior to the removal of said blocking disc;

a first and a second plug means for plugging said first and said second holes respectively subsequent to removal of said blocking disc from said tubular member;

a length of flexible hose having a first and a second end;

a first and a second coupling disposed adjacent said first and second end of said hose respectively;

a shut off valve having a first and a second end, said first end of said shut off valve being connected in fluid type communication with said first end of said hose, said second end of said shut off valve threadably cooperating with said second hole; and said second end of said hose being selectively connected to the source of fluid flow for filling the drainage system through said second hole prior to testing the drainage system, said second end of said hose being disconnected from said source of fluid flow and inserted through said first hole subsequent to the testing of the drainage system for permitting flow of fluid from said drainage system to said drain prior to removal of said blocking means.

14. A method of testing a drainage system comprising the steps of:

sealing an end of the drain within a second socket of an elongate tubular member;

inserting and sealing the end of the drainage system within a first end of the elongate tubular member;

removing a second plug from a second hole;

connecting a second end of a shut off valve to the second hole;

connecting a second end of a hose to a source of fluid flow;

opening the shut-off valve for permitting fluid to flow through the second hole into the drainage system for filling the same;

closing the shut-off valve;

testing the various joints of the drainage system to observe any leaks therein;

disconnecting the second end of the hose from the source of the fluid flow;

removing a first plug from a first hole;

inserting the second end of the hose within the first hole;

opening the shut-off valve for permitting fluid contained within the drainage system to flow from the drainage system through the shut-off valve and the hose to the drain for draining the drainage system;

removing a second end of the shut-off valve and the second end of the hose from the second and first holes respectively;

removing a closure from an access opening for gaining access to a blocking disc;

inserting a hand tool under an obliquely extending portion;

removing the disc through the access opening;

replacing the closure within the access opening; and replacing the first and second plugs within the first and second holes respectively.

* * * * *